(12) United States Patent
Cottone et al.

(10) Patent No.: US 8,538,579 B2
(45) Date of Patent: Sep. 17, 2013

(54) METHOD AND SYSTEM FOR DEPALLETIZING TIRES USING A ROBOT

(75) Inventors: Norbert Cottone, Zusmarshausen (DE); Thorsten Eberhardt, Neu-Ulm (DE); Sven Heissmeyer, Wennigsen (DE); Alexander Hollinger, Augsburg (DE); Martin Peghini, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 614 days.

(21) Appl. No.: 12/663,560

(22) PCT Filed: Jun. 10, 2008

(86) PCT No.: PCT/DE2008/000950
§ 371 (c)(1),
(2), (4) Date: Jul. 7, 2010

(87) PCT Pub. No.: WO2008/151613
PCT Pub. Date: Dec. 18, 2008

(65) Prior Publication Data
US 2010/0272547 A1    Oct. 28, 2010

(30) Foreign Application Priority Data
Jun. 12, 2007  (DE) .......................... 10 2007 026 956

(51) Int. Cl.
*B65G 65/00*    (2006.01)

(52) U.S. Cl.
USPC ........... 700/217; 700/260; 700/166; 414/730; 414/795; 414/799; 414/788

(58) Field of Classification Search
USPC ....................................................... 700/217
See application file for complete search history.

(56) References Cited

U.S. PATENT DOCUMENTS

| | | | |
|---|---|---|---|
| 4,449,903 A | | 5/1984 | Hasegawa et al. |
| 4,575,304 A | * | 3/1986 | Nakagawa et al. ........... 414/730 |
| 4,894,103 A | | 1/1990 | Bailey |
| 5,082,519 A | | 1/1992 | Klose et al. |
| 6,615,649 B1 | | 9/2003 | Kokubu et al. |
| 7,474,939 B2 | | 1/2009 | Oda et al. |
| 2001/0028838 A1 | * | 10/2001 | Leimbach et al. ............ 414/788 |
| 2002/0154986 A1 | * | 10/2002 | Leblanc et al. ............... 414/795 |
| 2004/0165980 A1 | * | 8/2004 | Huang et al. .................. 414/799 |
| 2006/0088405 A1 | | 4/2006 | Leimbach et al. |
| 2007/0248448 A1 | * | 10/2007 | Starz ............................. 414/788 |

(Continued)

FOREIGN PATENT DOCUMENTS

WO    WO 2007/083039 A2    7/2007
WO    WO 2007/083039 A3    7/2007

*Primary Examiner* — Gene Crawford
*Assistant Examiner* — Kyle Logan
(74) *Attorney, Agent, or Firm* — Schiff Hardin LLP

(57) ABSTRACT

In a method and system for depalletizing tires using a robot, wherein the tires are randomly located on a carrier, the position and orientation of outer tires on the carrier are detected using a sensor, and a processor, using a signal from the sensor, determines a tire that can be gripped by a gripping tool of an industrial robot, and calculates a movement path for the gripping tool for that tire. If the calculated path is not collision-free, another tire from among the outer tires is selected, and a movement path for depalletizing that tire is determined. The procedure is repeated until a collision-free movement path for a tire from among the outer tires is established. The gripping tool is then guided according to this collision-free movement path to depalletize the tire having the collision-free path associated therewith.

23 Claims, 6 Drawing Sheets

(56) References Cited

U.S. PATENT DOCUMENTS

| | | | |
|---|---|---|---|
| 2008/0082213 A1* | 4/2008 | Ban et al. | 700/260 |
| 2008/0161964 A1* | 7/2008 | Irie et al. | 700/166 |
| 2008/0316368 A1* | 12/2008 | Fritsch et al. | 348/722 |
| 2009/0306812 A1* | 12/2009 | Cottone et al. | 700/217 |

* cited by examiner

METHOD AND SYSTEM FOR DEPALLETIZING TIRES USING A ROBOT

FIELD OF THE INVENTION

The present invention concerns a method and a system for robot-directed depalletizing tires that are stored on a carrier.

DESCRIPTION OF THE PRIOR ART

The of tires is understood as the unloading of tires from a transport unit or a loading carrier, for example unloading from a container or from a grid pallet. In general, the spectrum of stacking patterns of the tires in their delivery ranges from organized to semi-organized to unorganized or chaotic. The unloading of tires is presently executed exclusively by hand in the case of partially organized or unorganized orientation of the tires on the loading carrier.

In most cases the palletizing of tires has also previously been conducted by hand. However, an automatic solution to stack tires on a carrier is known from DE 10 2005053 296 A1. However, even given a precise knowledge of the depositing position during the palletizing, an automatic unloading of the tires has still not always previously been possible since the stacking patterns for the most part vary somewhat during transport and the original, known tire positions and orientations then no longer coincide with the actual position of the tires.

Automatic solutions for the unloading of organized delivered tires are known. However, these solutions do not use a robot but rather use multi-axle portal systems that are employed both for palletizing and for depalletizing tires. For example, United States Patent Application Publication No. 2006/0088405 A1 discloses a method in which the tires are automatically stacked in a fishbone pattern and can also be unloaded again. However, special containers that prevent a sliding of the tires during transport are therefore required as load carriers. A depalletizing of unorganized or only partially organized tires or of tires in a stacking pattern that is unknown in advance is not possible with this method.

Different gripping tools are known for the gripping of tires. EP 1059148 B1 discloses a device to grip tires on the inner radius, wherein rotationally symmetrical elements are pressed against the bead and thus hold the tires. At least two of these retention elements are executed so as to be movable in the radial direction of the tire. The retention elements are borne such that they can rotate on an axle parallel to the central axis of the tire in order to enable a rotation of the tire around the central axis via a rotary drive mechanism.

In U.S. Pat. No. 5,082,519 A a gripping tool is described that is based on the principle of a parallel gripper with two gripping jaws that can be moved against one another that grip carcasses of tires on the outer diameter. The tire carcasses are repositioned within the production process with this gripping tool.

GB 2126153 A describes a method and a gripping tool for loading and unloading a tire vulcanization machine. The raw tires are thereby gripped on the inner bead with three movable clamping jaws.

Furthermore, in U.S. Pat. No. 4,894,103 a gripping tool is described which, in the field of tire production, is in the position to place tire carcasses in a tire mold machine and to subsequently remove a raw tire. The gripping tool has four arc elements that are moved to grip in the radial direction. The carcasses or, respectively, the raw tires can therefore be gripped both from the outside and from the inside.

An object of the present invention is to provide a method and a system for depalletizing tires that requires no special containers for the delivery of the tires and with which even unorganized or only partially organized tires can be automatically unloaded from a load carrier.

SUMMARY OF THE INVENTION

The above object is achieved in accordance with the invention by a method for depalletizing tires, wherein the following sequence of steps is repeatedly implemented by an industrial robot. First, the spatial position and orientation of outer tires of the tire stack to be unloaded, as well as optionally the spatial position and orientation of the carrier of the tires, are detected with a sensor technology. The outer tires means the tires of the tire stack on the carrier that are directly accessible or detectable by the sensor from the outside. A 3D sensor system is advantageously used with which a three-dimensional environment can be mapped. Examples of such sensor systems are stereo cameras, PMD cameras (PMD: photonic mixer device), devices to implement a light section method (triangulation) or devices for delay measurement with the aid of a laser. Using the delivered sensor signals or sensor data, the spatial positions and the spatial orientation of the tires (and optionally of the carrier) can be determined and provided to the robot after corresponding analysis and preparation. For example, a detection of position and orientation of the carrier with the sensor can be omitted when this position and orientation are known, for example due to a defined stop on the floor at which the carrier is positioned for unloading. The geometry of the tires and of the carrier can either likewise be detected via the sensor or be provided for the implementation of the method since they are normally already known before the unloading.

Before a computer processes the sensor data for evaluation and transmits the path data to the robot controller, the precise gripping point is established, and whether the movement path determined for gripping the respective tire can be handled without collision is checked. For this purpose, a tire among the previously detected outer tires that is to be gripped with the present gripping tool is initially selected according to predeterminable criteria. Criteria for this can be, for example, the quality or rating of the tire detection, the absolute height of the tire on the carrier or the number of overlaps by other tires. One or more movement paths of the gripping tool to grip and depallet the tire are subsequently calculated for the tire selected according to the predetermined criteria. The movement paths are advantageously determined for different grip positions or grip types that are possible with the gripping tool. Collisions with the carrier and other tires that are possible for the calculated movement paths are subsequently determined. This ensues on the basis of a 3D model of the gripping tool and the carrier, as well as on the basis of sensor data of the sensor from which the position of the tires and (in the event that it is not already known) that of the carrier can also be derived. The determination of the possible collisions can ensue in an order of the movement paths that is established by predetermined preferred values. After the first movement path without collision has been determined in the order of these preferred values, the further calculation can be terminated. The gripping tool is then automatically directed to the tire designated for gripping with the robot on the calculated movement path. The tire is gripped with the gripping tool, unloaded from the carrier on the calculated movement path and deposited at an established position. In the event that none of the movement paths calculated for the tires is possible without a collision, a new tire is designated that corresponds nearest to the predeterminable criteria. The further steps (i.e. the calculation of the movement paths and the collision testing) are then implemented for this tire. This procedure is repeated until a tire with a collision-free movement path has been determined that is then unloaded in the manner described above. After the unloading of the tire, the described sequence of method steps is respectively implemented again until the carrier has been completely unloaded.

Neither the stacking pattern of the tires on the carrier nor the precise position of the carrier must be known in advance for the correct mode of operation of the method and of the associated system. The tires are automatically detected and unloaded independent of their position on the carrier. The invention thus enables the fully automatic unloading even of transport units with different tire types. However, it is advantageous when the geometry of the tires does not need to first be detected by the sensor but rather is already known and provided in advance. This accelerates the detection of the position and orientation of the tires and increases the reliability. The same applies for the geometry of the carrier of the tires.

Using an industrial robot with a gripping tool and a sensor system, arbitrarily stacked or oriented tires can be unloaded from a carrier without collision with the environment and be deposited in a partially organized or organized manner on a depositing surface. It is irrelevant whether the tires on the carrier are present in an organized, semi-organized or wholly unorganized state. In comparison to the prior art, the physically hard and monotonous work of unloading is done away with via the robot-controlled depalletizing, such that the health of employees is protected and a cost savings occurs. Moreover, a uniform quality and output is ensured by automation. The method and the associated system also require no specially fashioned containers for the transport or the provision of the tires.

An associated depalletizing system according to the invention has a multi-axis industrial robot (advantageously a 6-axis articulated arm robot), a gripping tool, a 3D sensor, a movement mechanism for the 3D sensor (for example in the form of a linear axle) and an evaluation unit or computer that evaluates the sensor data and the possibly present geometry data of the tires and the carrier in the manner specified in the method and transmits the path data for the gripping movement to be executed to the industrial robot. For example, this evaluation unit can be a personal computer (PC) that is connected with the robot and the sensor. The evaluation unit or a part of the evaluation unit can also be implemented in the control unit of the industrial robot.

For the implementation of the method, the use of a gripping tool that can execute multiple different grip types—and therefore can grip tires present in arbitrary orientation—is advantageous. A preferred gripping tool for this use comprises two gripping jaws, of which at least one gripping jaw can be moved against the other gripping jaw, as well as a drive that moves the two gripping jaws against one another or apart from one another to grip a tire. The gripping jaws are fashioned so that they can be inserted into the opening of a tire. Both gripping jaws can hereby be movable, or one gripping jaw can be moveable and the other fixed.

With a gripping tool of such a design, tires can be gripped by clamping on the inner bead in the axial gripping direction; via clamping across the tire width in the axial gripping direction; via clamping across the tire height in the radial gripping direction; via clamping across the inner rim mouth region in the axial gripping direction; or via clamping on the inner bead in the radial gripping direction.

In the gripping tool according to the invention, the gripping jaws can be moved relative to one another in a translatory or rotary manner and are directed accordingly for this. The drive can, for example, be of an electrical, pneumatic or hydraulic type. A controller for the drive is additionally advantageously provided that detects and regulates the gripping force or, respectively, clamping force in order to avoid damage to the tire. In one embodiment this can ensue directly via separate sensors at the gripper, for example via strain gauges, manometric switches etc. In another embodiment, depending on the manner of actuation the detection of the gripping force can also ensue via measurement of the motor current given electrical actuation or via measurement of the pressure given a pneumatic or hydraulic drive.

To avoid the slippage of the tires, one or both gripping jaws can additionally be provided with a web or step, or with a cover increasing friction, or with a corresponding coating (for example made of rubber).

In a preferred embodiment, the depalletizing system according to the invention is fashioned so that it can also be used for palletizing tires in addition to depalletizing tires. This requires the implementation of a module that calculates the corresponding path data for the palletizing and transmits it to the robot. The method advantageously used for this is described in detail in DE 10 2005 053 296 A1, the content of which is herewith incorporated in its entirety into the present Patent Application. In this method for the automatic stacking of tires on a carrier, geometry data of the tires and/or a digital tire model of the tires are initially provided or generated. These geometry data are data such as external diameter, inner diameter and tire width, as well as possibly the rim mouth width. A digital tire model of the tires can also be provided or automatically generated from the geometry data. Conversely, the geometry data can also be automatically derived from the digital tire model. On the basis of the geometry data and/or of the tire model and a predeterminable size of the carrier, a program or, respectively, algorithm calculates a stacking pattern for the tires on the carrier that enables a stable storage of an optimally large number of tires on the carrier. The algorithm advantageously calculates a rickrack pattern or a vertical pattern. In a particular embodiment, the user can provide the stacking pattern type or select it from a predetermined selection. After the offline calculation of the stacking pattern for tires of the provided geometry data or of the provided tire model, the position data of the tires are automatically adopted from the stacking pattern and associated movement paths of the gripping tool for the stacking of the tires according to the stacking pattern are generated and stored. Position data are data of the location as well as the orientation of the tires. The calculation of the stacking pattern advantageously already ensues in advance for multiple different tire sizes or, respectively, tire types that should later be stacked. The corresponding position data and movement paths are stored in a database together with identification information of the tire type. A collision test on the basis of the digital tire model is also implemented given the calculation of the stacking pattern and generation of the movement paths in order to enable the later automatic stacking without collisions, and thus without additional interventions or corrections. In the stacking of the tires, the stored position data and associated movement paths are then retrieved and passed to the robot that takes up the tires at the predetermined take-up position and deposits them on the carrier corresponding to the position data and associated movement paths. Given use of a database with multiple tire types, the tires to be stacked are thereby initially identified and the position data and movement paths associated with these tires are subsequently retrieved using the stored identification information.

For the embodiment of a combined palletizing and depalletizing system, a gripping tool that enables a clamping on the inner bead in the radial direction is particularly advantageous. In this gripping principle, the tires are automatically centered and aligned, whereby the palletizing is simplified due to the defined orientation of the tires on the gripping tool. With such a combined palletizing and depalletizing system, after the depalletizing from one carrier it is also possible to in turn pallet the tires on another carrier with the same system.

DESCRIPTION OF THE PREFERRED EMBODIMENTS

Figure 1:
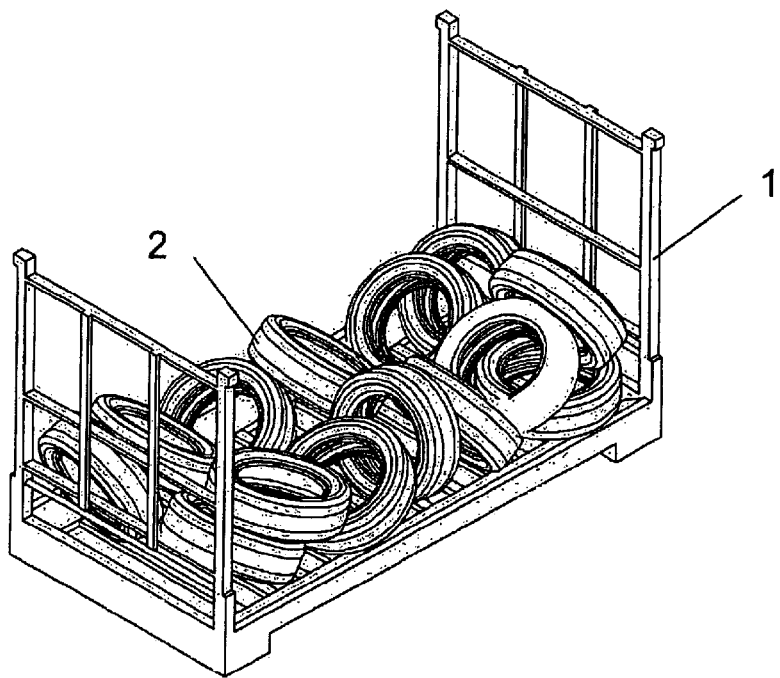
FIG. 1 shows an example of a type of carrier to be unloaded with a depalletizing system, containing tires located thereon in an unorganized stack.

The depalletizing method and the associated depalletizing system according to the invention enable the automatic unloading of tires that are stacked on a transport unit with a robot (in particular a 6-axis articulated arm robot). In this regard FIG. 1 shows an example of a transport unit 1 on which are stacked multiple tires 2 (unorganized in the present case). Such a transport unit 1 is normally placed in an unloading region with a floor conveyor apparatus, for example a forklift or a lift trick. In the proposed method, such a transport unit 1 is unloaded with a depalletizing system as it is shown by way of example in FIG. 2.

Figure 2:
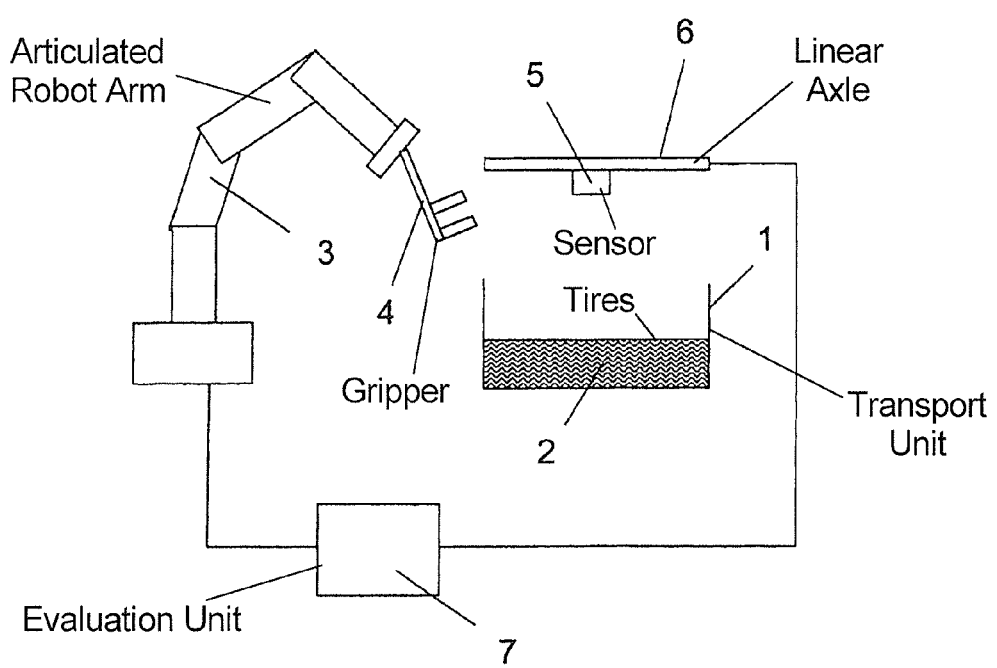
FIG. 2 schematically illustrates a depalletizing system for depalletizing tires using a robot, in accordance with the present invention.

FIG. 2 shows an exemplary depalletizing system according to the present invention in a significantly schematized presentation. The depalletizing system has a 6-axis articulated arm robot 3 with a gripper 4 that is coupled via a connection flange to the arm of the articulated arm robot 3. A linear axle 6 that bears a 3D sensor 5 is arranged above the unloading region in which the transport unit 1 with the tires 2 is deposited. The 3D sensor 5 is moved above the transport unit 1 along the linear axle in order to acquire a surface topography of the transport unit 1 with the tires 2 located on it. An evaluation unit 7 (in the present example a PC) connected with the PC sensor evaluates the sensor data corresponding to the proposed method and transmits the path data for gripping the respective tire to the articulated arm robot 3. In this way the tires 2 are unloaded in succession from the transport unit 1 and are deposited at a position (not shown in FIG. 2). This position must naturally lie within the working range of the articulated arm robot 3. The tires 2 can hereby be deposited in an unorganized or organized manner. In particular, the tires can also be loaded directly onto an additional transport unit, for example in a rickrack pattern or a vertical pattern (as this is described in detail in DE 10 2005 053 296 A1). The evaluation unit 7 must merely possess a corresponding module to generate the path data according to this publication. Furthermore, given the use of this palletizing method it is also possible to initially unload the tires from the transport unit 1 and deposit them on a surface provided for this and to pallet them again on an empty provided carrier at a later point in time.

Figure 3:
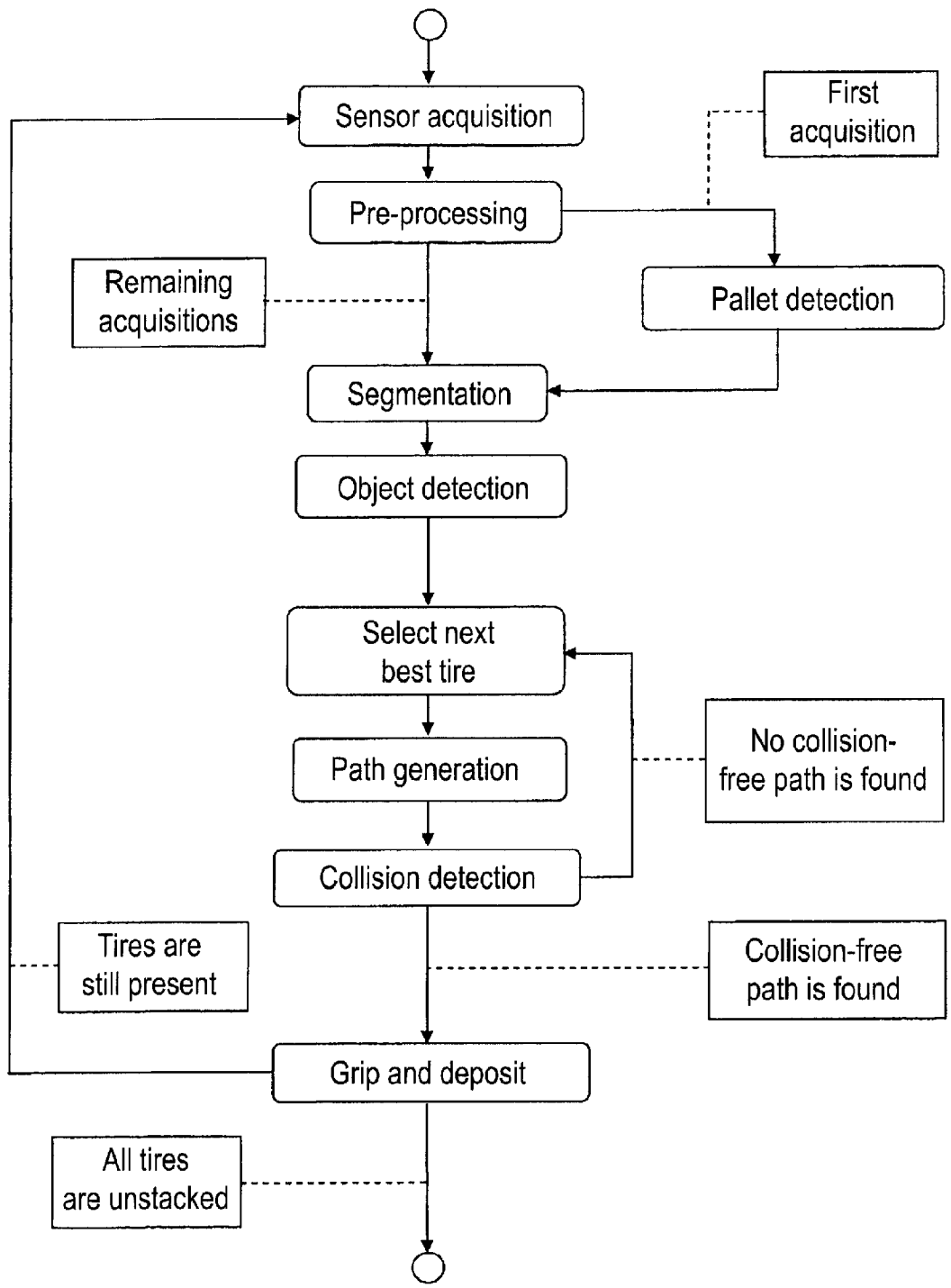
FIG. 3 shows an example of a flowchart for implementation of an embodiment of a method for depalletizing tires in accordance with the present invention.

Exemplary method steps for the unloading of the tires 2 from the transport unit 1 according to the embodiment of the proposed method are explained using the workflow diagram of FIG. 3. For this an algorithm is implemented in the evaluation unit 7 that activates the linear axle 6 to move the 3D sensor over the transport unit 1, which evaluation unit 7 evaluates sensor data delivered by the 3D sensor and generates the corresponding path data and transmits it to the articulated arm robot 3 for the execution of the gripping and unloading movement. The individual steps executed or initiated by the evaluation unit 7 are:

1) The 3D sensor 5, operating without contact, is moved linearly above the transport unit 1 with the tires 2, whereby in the present example a three-dimensional scatter plot is generated. Alternatively, the movement of the sensor is also produced via rotation around an axis.

2) The sensor data (scatter plot) are prepared and segmented. What is understood by segmentation is the combination of points with similar characteristics to locate subjects. The tire segments are then selected and combined into tire objects.

3) The tires are detected with the aid of a method for error minimization (what is known as "least squares") and their position, orientation and geometric dimensions are determined. If the dimensions of the tires are known in advance, the precision of the detection can be increased.

4) The detected tires are sorted with regard to specific criteria so that the first tires to be gripped can be defined. Criteria in this regard are, for example, the quality/rating of the tire detection, the absolute height of the tire in the transport unit and the number of overlaps by other tires.

5) The path data are then generated for the gripping and depositing of the first tire to be gripped. For this specific grip positions defined relative to the tires (which grip positions are provided with different preference values) are configured in advance. It is thus established in advance which grips are possible with the gripper at this tire. The precise grip position (6D data) is calculated from the respective position of the tire within the stack. The environment is also concurrently taken into account at the precise grip position. If another tire lies in front of the tire to be gripped, the gripper cannot be driven onto the tire from this position. If two tires are interlaced with one another (one tire penetrates the other), this is detected and the gripping position and the approach position are accordingly corrected. Only one possible (one optimal) path or multiple paths are respectively generated for a tire.

6) If the first tire to be gripped and its path data are known, the generated paths are checked for collisions in the order of their preference values. Both collisions of the gripper 4 with the transport unit 1 and with other tires are thereby checked. A CAD model of the gripper 4 and a CAD model of the transport unit 1 are used for the collision detection. The collision detection with the surrounding tires ensues based on the actual sensor data. If a collision exists, the next path is thus checked. If no collision-free path is found, the next tire is checked that satisfies the above criteria. This is repeated until a collision-free path has been found or a predeterminable termination criterion occurs.

7) The found path is transformed into the robot coordinate system and sent to the robot controller.

8) The robot with attached gripper leaves the path points, thus grips the tire and deposits it on the provided depositing surface.

In principle, multiple tires could be unstacked with one sensor acquisition. However, it is not ensured that the other tires do not move due to the removal of one tire. After the removal of a tire, a new acquisition with the 3D sensor is thus made and the above algorithm begins from the start. The algorithm ends when all tires have been unstacked from the transport unit 1.

For the collision testing of the gripper with the load carrier it is not sufficient to rely on the load carrier having been detected with the sensor. Due to the surface condition of the load carrier the sensor possibly does not deliver any reliable data and, moreover, portions of the load carrier can be located in what is known as the shadow region of the sensor, such that the load carrier is not entirely visible to the sensor but rather is covered by itself or by other objects.

In order to ensure a correct collision testing in all cases, in the present example a CAD model of the load carrier is therefore used. The geometric shape of the load carrier is thus known (even in shadowed regions), and only the correct position and orientation of the load carrier must still be determined.

The placement of a transport unit with a floor conveyor apparatus is for the most part plagued with a certain error. A hard specification of a placement position for the transport unit would therefore lead to an error in the collision detection that can no longer be tolerated since simulation and reality no longer agree, or an increased effort must be made in a centering device for the load carrier. The proposed method was therefore designed so that a fixed specification of the placement position can be foregone.

Position and orientation of the charge carrier are advantageously determined automatically from the sensor data that are obtained via an acquisition of the entire transport unit. For this the transport unit must lie within the detection range of the respective sensor system.

The algorithm used in the present example for the detection of the position of the transport unit operates as follows:
1) Preparation and segmentation of the scatter plot acquired with the 3D sensor, as already explained further above.
2) The segment with the data that corresponding to the transport unit with the objects located thereon is projected onto the floor.
3) The point density in the projection is reduced for faster additional processing without, however, severely altering the convex envelope of the points.
4) The resulting scatter plot A is copied (scatter plot B). Scatter plot B is shifted perpendicular to the plane of scatter plot B.
5) The bounding box of the two scatter plots A and B is calculated. The position of the transport unit results from this.

The reliable implementation of the method requires a gripping tool that enables a flexible accommodation of tires. As used herein, a flexible accommodation means that the tires can be gripped in different ways with the gripping tool in order to account for the different positions and orientations of the tire on the load carrier. Tires can be gripped very flexibly and in different ways as needed with the gripping tool described in the following.

Figure 4:
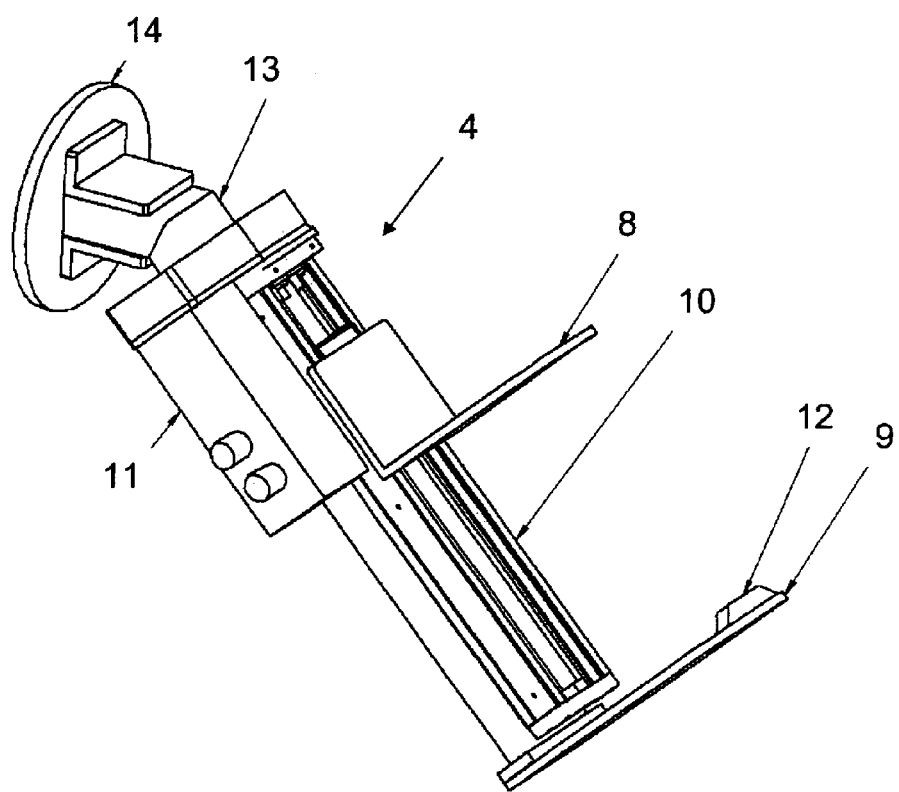
FIG. 4 schematically illustrates a gripping tool for use with the robot in accordance with the method and system of the present invention.

The gripping tool of FIG. 4 essentially represents a pair of gripper jaws that possesses either two movable gripper jaws (as in the example of FIG. 4), one movable gripper jaw 8 and one stationary gripper jaw 9 to grip a tire. The gripper jaws can hereby be moved in a translatory manner (as in the present example) or also in a rotary manner relative to one another and are correspondingly directed for this. FIG. 4 shows a direction 10 for the execution of a translatory movement of the gripper jaw 8. The drive 11 of the gripping tool can be of an electrical, pneumatic or hydraulic nature.

In the present example, the stationary gripper jaw 9 is formed with a step 12 in order to prevent the slippage of the tire. Furthermore, the gripping jaws can be coated to increase the friction.

The gripping tool 4 is attached to the robot arm with a flange plate 13. The gripping tool thereby possesses an offset angle between the attachment pipe 14 that is aligned along the longitudinal axis of the gripping tool and the flange plate 13 (and therefore the robot arm). This offset angle can also be designed so as to be adjustable in order to prevent collisions between robot/gripper and transport unit/tire given different approach strategies, in particular at the side walls of the transport unit.

In order to avoid damage to the tires, the gripping force or, respectively, clamping force should be accordingly detected and regulated. This can occur directly via separate sensors at the gripper or—depending on the type of drive—also via measurement of the motor current (given electrical actuation) or of the pressure given pneumatic or hydraulic actuation. The controller required for this is implemented in the drive unit.

With the use of this gripping tool it is possible to grip a tire in different ways as they are schematically presented in FIG. 5. In this regard FIG. 5 shows a section through one side of a tire 2 and the two gripping jaws 8, 9 of the gripping tool. The gripping movement itself is indicated by the arrows.

Figure 5A:
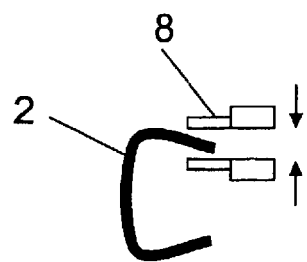
FIGS. 5a, 5b, 5c, 5d and 5e schematically illustrate the interaction of the gripping tool of FIG. 4 with a tire, in accordance with the present invention.
Figure 5B:
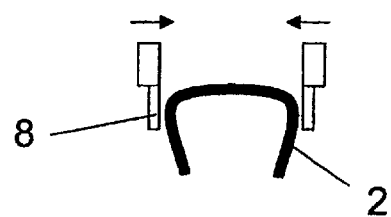
Figure 5C:
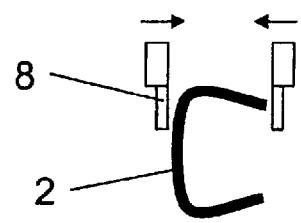
Figure 5D:
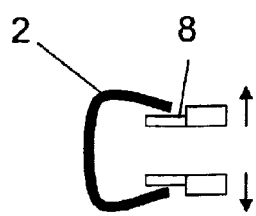
Figure 5E:
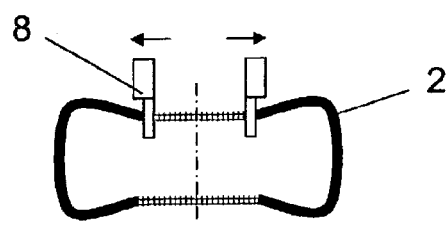

In this regard FIG. 5*a* shows a clamping on an inner bead of the tire in the axial direction. The gripping jaws can hereby also be aligned upward or downward depending on the position of the tire. FIG. 5*b* shows a clamping of the tire axially across the tire width. The clamping of the tire across the tire height is indicated in FIG. 5*c*. FIG. 5*d* shows the clamping of the tire across the inner rim mouth region. Finally, FIG. 5*d* shows a clamping of a tire 2 (here in a complete section view) on the inner bead in the radial direction. The gripping type is particularly advantageous for a subsequently palletizing of the tire since the tires in the gripping type are automatically centered and aligned.

Naturally, modifications of the geometry of the gripping tool in order to provide a gripper with different grip types for tires are also possible.

Although modifications and changes may be suggested by those skilled in the art, it is the intention of the inventors to embody within the patent warranted heron all changes and modifications as reasonably and properly come within the scope of their contribution to the art.

We claim as our invention:
1. A method for robot-implemented depalletizing of tires on a carrier, comprising repeated implementation of the steps of:
   at a depalletizing site at which an aggregation of tires on a carrier is located, with respective positions and orientations of individual tires in said aggregation being initially unknown at said depalletizing site, operating a sensor to detect sensor data representing said position and orientation of outer tires in said aggregation;
   supplying said sensor data to a processor and, in said processor, automatically identifying the position and orientation of each outer tire in said aggregation and automatically determining therefrom one tire, among said outer tires, that is to be gripped with a gripping tool of a robot, according to predetermined criteria;

in said processor, automatically calculating movement paths of said gripping tool to grip and depalletize said one tire for each of a plurality of different grip positions of said gripping tool;

using 3D models of said gripping tool, said one tire, and said carrier, and the position and orientation of said outer tires, testing, in said processor, collisions between said carrier and said gripping tool that occur in the respective movement paths;

in said processor, automatically determining whether a collision-free movement path exists among said plurality of calculated movement paths, in which no collision between said gripping tool and said carrier occurs and, if no collision-free movement path exists, selecting a different tire, from among said outer tires, to be gripped and repeating calculation of said movement paths and testing of collisions between said gripping tool and said carrier, for said different tire, until a tire is determined for which a collision-free movement path exists; and operating said industrial robot to grip said tire for which said collision-free movement path exists with said gripping tool, and depalletizing said tire for which said collision-free movement path exists by moving said gripping tool with said industrial robot along said collision-free movement path.

2. A method as claimed in claim 1 comprising, operating said sensor to also detect a position and orientation of said carrier, and supplying a signal from said sensor to said processor that indicates said position and orientation of said carrier.

3. A method as claimed in claim 2 wherein the said sensor data represent a surface topography of said carrier and a surface topography of said outer tires, and wherein said processor is configured to implement a detection algorithm making use of said surface topography of said carrier and said surface topography of said outer tires.

4. A method as claimed in claim 1 wherein said signal from said sensor represents a surface topography of said outer tires, and wherein said processor is configured to determine said position and orientation of said outer tires by implementing a detection algorithm using said surface topography of said outer tires.

5. A method as claimed in claim 1 comprising supplying a designation to said processor indicating geometry of said carrier, and wherein said processor is configured to calculate said movement paths dependent on said geometry of said carrier.

6. A method as claimed in claim 1 comprising supplying a designation to said processor indicating geometry of said outer tires, and wherein said processor is configured to calculate said movement paths dependent on said geometry of said outer tires.

7. A method as claimed in claim 1 comprising employing, among said predetermined criteria, at least one criterion selected from the group consisting of a height of said one tire or said different tire on said carrier, a degree of coverage by said one tire or said different tires over other tires in said stack, and a reliability of detection of said one tire or said different tire.

8. A method as claimed in claim 1 comprising employing a gripping tool configured to enable different gripping configurations for said tires.

9. A method as claimed in claim 8 comprising employing a gripping tool comprising at least two gripping jaws movable toward and away from each other, and configured for insertion into an opening of said tires.

10. A method as claimed in claim 8 comprising employing a gripping tool having a movable gripping jaw and a fixed gripping jaw, with said movable gripping jaw being movable toward and away from said fixed gripping jaw, and with said movable gripping jaw and said fixed gripping jaw being insertable into an opening of said tires.

11. A method as claimed in claim 1 comprising moving said gripping tool with an articulated arm of said industrial robot.

12. A method as claimed in claim 1 comprising moving said sensor above said carrier with said tires thereon to detect said position and orientation of said outer tires with said sensor.

13. A depalletizing system for depalletizing tires on a carrier, said system comprising:

an industrial robot having a gripping tool located at a depalletizing site at which an aggregation of tires on a carrier is located, with respective positions and orientations of individual tires in said aggregation being initially unknown at said depalletizing site;

a 3D sensor configured to detect sensor data representing said position and orientation of outer tires in said aggregation; and a processor supplied with said sensor data and configured to identify the position and orientation of each outer tire in said aggregation and automatically determine therefrom of one tire of the outer tires that is to be gripped with said gripping tool according to predeterminable criteria, calculate movement paths of the gripping tool to grip and depalletize the tire designated for gripping for each of a plurality of different grip positions of the gripping tool, test possible collisions with the carrier and other tires for the calculated movement paths on the basis of a 3D model of the gripping tool, the tire and the carrier, as well as on the basis of sensor data of the sensor, establish the calculated movement paths for which no collision is determined; or, in the event that no movement path without collision is determined, determine a different tire to be gripped and repeat the last steps until a tire is determined for which a movement path without collision can be established, direct the gripping tool with said industrial robot to a tire designated for gripping, grip the tire with the gripping tool and direct the gripping tool with the tire on the established movement path in order to deposit the tire at an established position.

14. A depalletizing system as claimed in claim 13 wherein said industrial robot is an articulated arm robot with said gripper tool carried on an articulated arm thereof.

15. A depalletizing system as claimed in claim 13 wherein said 3D sensor comprises a movement mechanism formed by a linear axle of said industrial robot.

16. A depalletizing system as claimed in claim 13 wherein said gripping tool comprises at least two gripping jaws, with at least one of said gripping jaws being movable toward and away from another of the gripping jaws, and a drive that moves said at least one gripping jaw, said at least two gripping jaws being configured to be inserted into an opening of said tires.

17. A depalletizing system as claimed in claim 16 comprising a controller that operates said drive to regulate a contact pressure force of said at least two gripping jaws during gripping thereby.

18. A depalletizing system as claimed in claim 16 wherein at least one of said at least two gripping jaws comprises a step or a web configured to prevent slippage of a tire, said step being configured to rest inside or outside of a tire during gripping by said gripping tool.

19. A depalletizing system as claimed in claim 16 wherein at least one of said at least two gripping jaws comprises a cover or coating that increases friction between said gripping tool and said tires.

20. A depalletizing system as claimed in claim 16 comprising a gripping mechanism connected to said at least two gripping jaws that causes said gripping jaws to execute a movement relative to each other selected from the group consisting of a translatory movement and a rotary movement.

21. A depalletizing system as claimed in claim 13 wherein said gripping tool comprises a flange plate that couples said gripping tool to said industrial robot, said gripping tool having a longitudinal axis and said flange plate being oriented with a surface normal of said flange plate at a non-zero angle relative to said longitudinal axis.

22. A depalletizing system as claimed in claim 13 wherein said gripping tool comprises a flange plate that couples said gripping tool to said industrial robot, said gripping tool having a longitudinal axis and said flange plate being oriented with a surface normal of said flange plate at an adjustable angle relative to said longitudinal axis.

23. A depalletizing system as claimed in claim 13 wherein said processor comprises a processor module configured to calculate movement paths for palletizing said tires on a different carrier.

* * * * *